United States Patent [19]

Steigerwald

[11] 4,211,969

[45] Jul. 8, 1980

[54] HIGH EFFICIENCY CIRCUIT FOR RAPIDLY CHARGING BATTERIES

[75] Inventor: Robert L. Steigerwald, Scotia, N.Y.

[73] Assignee: General Electric Company, Schenectady, N.Y.

[21] Appl. No.: 958,698

[22] Filed: Nov. 8, 1978

[51] Int. Cl.² .............................................. H02J 7/10
[52] U.S. Cl. ....................................... 320/14; 320/21; 320/59
[58] Field of Search .......................... 320/14, 20, 21, 30

[56] References Cited

U.S. PATENT DOCUMENTS

| | | | |
|---|---|---|---|
| 3,614,581 | 10/1971 | Frost | 320/21 |
| 3,614,582 | 10/1971 | Burkett et al. | 320/14 X |
| 3,622,857 | 11/1971 | Sethi | 320/14 |
| 3,656,046 | 4/1972 | Parke | 320/59 |
| 3,683,256 | 8/1972 | Mas | 320/14 |
| 3,732,481 | 5/1973 | Mas | 320/14 |

FOREIGN PATENT DOCUMENTS 431588  7/1975  U.S.S.R. .................................. 320/21

Primary Examiner—Robert J. Hickey
Attorney, Agent, or Firm—Robert B. Levy; James C. Davis; Marvin Snyder

[57] ABSTRACT

An improved battery charger circuit for rapidly charging batteries by increasing the rate of battery charge acceptance through periodic battery discharge pulses during the charging process includes first and second chopper circuits coupled in parallel through an inductor across the DC source for coupling to a battery.

The first chopper circuit controls the amplitude of battery charge current while the second chopper circuit controls the amplitude of battery discharge current and provides a low impedance conduction path for discharge current to be returned to the DC source, thus realizing an efficient battery charger circuit.

8 Claims, 3 Drawing Figures

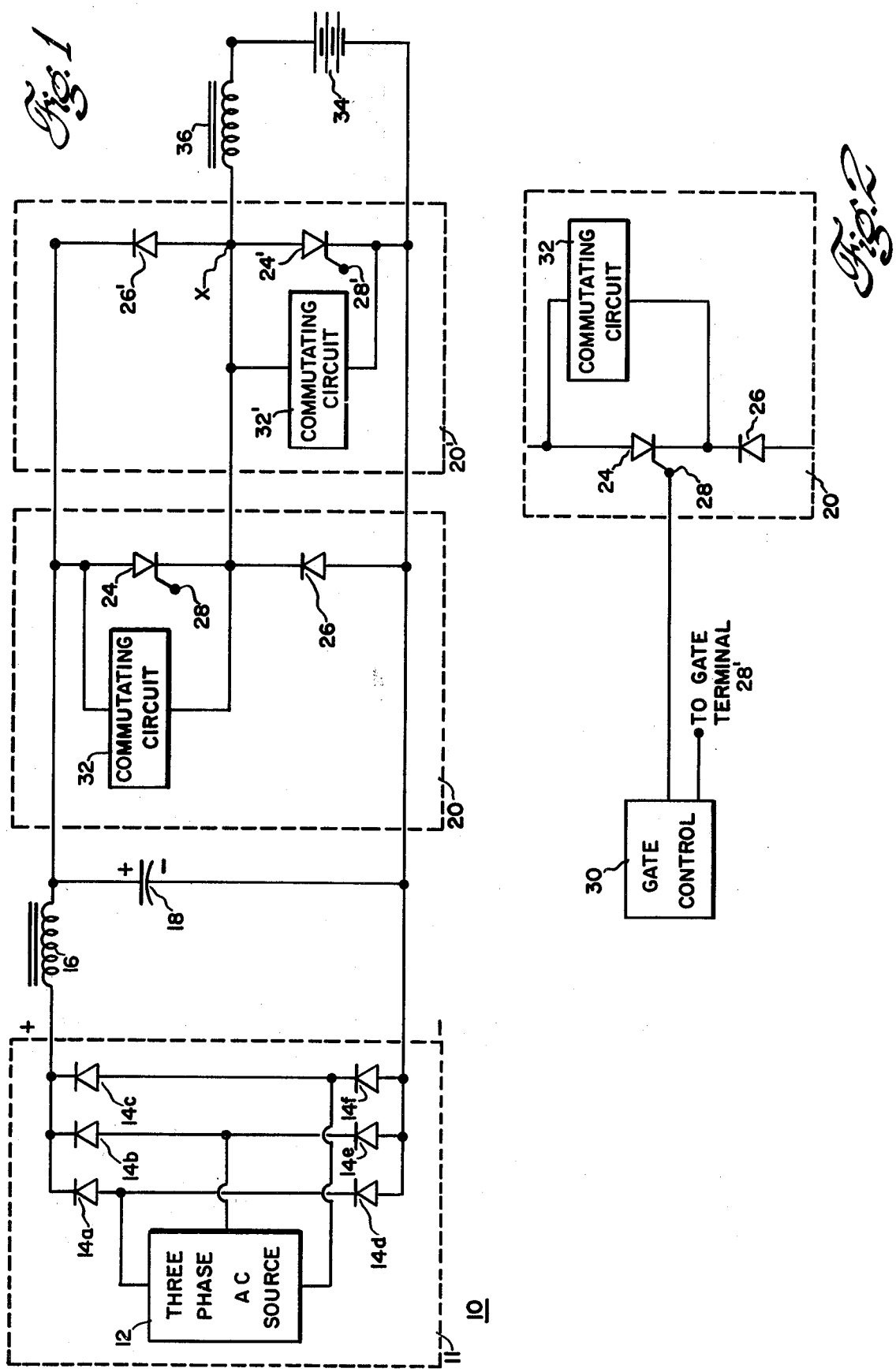

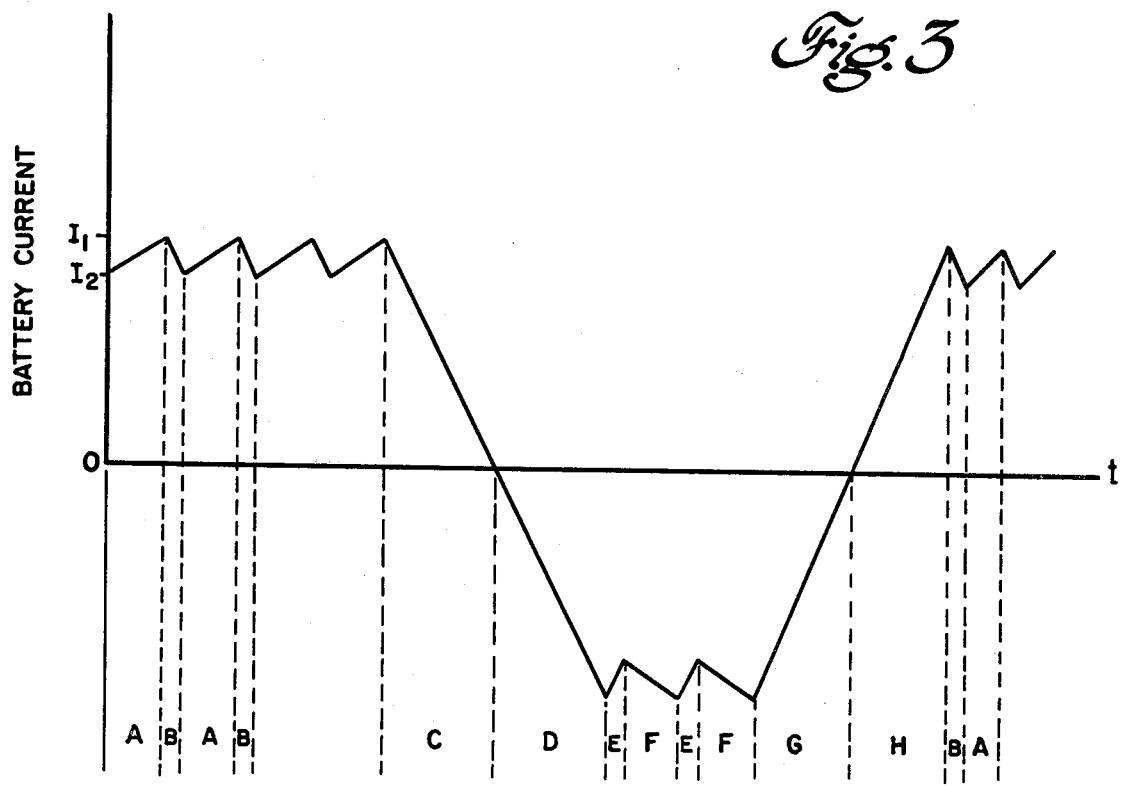

HIGH EFFICIENCY CIRCUIT FOR RAPIDLY CHARGING BATTERIES

BACKGROUND OF THE INVENTION

This invention relates to a battery charger circuit, and more specifically to a battery charger circuit having means therein for periodically discharging the battery during the charging process to increase the rate of battery charge acceptance.

Recent advancements in the field of battery charger circuits include the discovery that rate of battery charge acceptance may be increased through periodic battery discharge during the charging process. By periodically discharging the battery through high current discharge pulses during the charging process, charging time may be drastically reduced in comparison with the charging time required by use of conventional charging methods.

One such battery charging circuit for periodically producing high current battery discharge pulses is disclosed in U.S. Pat. No. 3,816,806 issued June 11, 1974 to Joseph Mas. High current battery discharge pulses are generated according to the Mas patent by causing a high current transistor, serially connected with a relatively low resistance and the battery under charge, to conduct, thus diverting charge current and causing high current power pulses supplied by the sum of charge current and battery discharge current to be dissipated in the resistance. When the high current transistor is non-conductive, the battery receives undiverted charge current from the current source, thus continuing the charging process.

A disadvantage of the battery charger circuit disclosed by Mas is that the discharge power pulse is dissipated is the resistance, thus generating power losses. As the frequency of discharge increases, these losses become substantial, resulting in inefficient operation.

The battery charger according to the teaching of the present invention alleviates the disadvantage of discharge energy being dissipated through a resistive element. The present invention contemplates a battery charger circuit in which battery discharge energy is stored for later return to the battery during the charging cycle.

SUMMARY OF THE INVENTION

Briefly, in accordance with the preferred embodiment of the invention, an improved battery charger circuit for rapidly and efficiently charging a battery by periodic, substantially lossless, battery discharge at a high rate for short intervals during the charging process comprises a DC current source coupled in parallel with energy storage means for alternately storing battery discharge energy during battery discharge intervals and returning stored discharge energy to the battery during selected charging time intervals.

An inductor is adapted for coupling to a battery under charge for maintaining decreasing current conduction through the inductor and the battery when connection to the DC source and energy storage means is interrupted.

A first chopper circuit, responsive to an external gate signal, alternately conducts battery charge current from the DC source when it is gated into conduction and circulates battery charge current during intervals other than when the first chopper circuit is conductive.

A second chopper circuit, responsive to an external gate signal, is also coupled to the source of DC and the inductor, and provides a low loss discharge path to the battery for causing high current discharge pulses when the second chopper circuit is gated into conduction and alternately diverts current from the discharge path into the energy storage means during intervals other than when it is conductive.

It is an object of the present invention to provide a high efficiency battery charger circuit for increasing the rate of battery charge acceptance by periodically discharging a battery with high current discharge pulses.

It is a further object of this invention to provide a battery charger circuit in which periodic discharge pulse energy is stored and returned to the battery during each successive charging time interval so as to discharge the battery in a substantially lossless manner.

BRIEF DESCRIPTION OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 1 is a schematic representation of a battery charger circuit according to the teachings of the present invention;

FIG. 2 is a schematic representation of a portion of the battery charger circuit disclosed in FIG. 1, showing the connection thereof to an external gate control signal source; and FIG. 3 is a graphic representation of the operation of the battery charger circuit of FIG. 1 showing battery charge current variation with respect to time.

DETAILED DESCRIPTION OF THE PREFERRED EMBODIMENT

In FIG. 1, there is shown a high efficiency battery charger circuit 10 according to the present invention including a source of DC current 11. DC current source 11 may be realized from any suitable DC current source capable of supplying sufficient current for charging a battery. In the presently preferred embodiment of FIG. 1, current source 11 is comprised of a three phase AC source 12 coupled to a three phase bridge rectifier network comprised of three pairs of serially connected rectifiers 14a and 14d, 14b and 14e and 14c and 14f, respectively, with each pair of rectifiers coupled at the respective pair-junction to a corresponding phase of three phase source 12. The cathode terminals of rectifiers 14a, 14b and 14c are coupled together to yield the positive terminal of current source 11 while the anode terminals of rectifiers 14d, 14e and 14f are coupled together to yield the negative current source terminal. An inductor 16 is coupled between the positive current source terminal and the first terminal of a capacitor 18. Capacitor 18, connected at the remaining terminal thereof to the negative terminal of current source 11 serves together with inductor 16 to filter the DC current output of current source 11. As will be described in greater detail below, capacitor 18 is of sufficient magnitude to store much of the energy in high current discharge pulses produced by the battery during discharge time intervals.

A pair of chopper circuits 20 and 20', respectively, are coupled in parallel across capacitor 18. As will be described in further detail below, chopper circuit 20 controls the amplitude and duration of battery charge current conduction while chopper circuit 20' controls the amplitude and duration of battery discharge current conduction. Each of chopper circuits 20 and 20' are identical in operation. Therefore, only the configuration of chopper circuit 20 will be described in detail, it being understood that chopper circuit 20' is configured of like components, each referenced by like numerals followed by a prime symbol.

As shown in FIG. 2, chopper circuit 20 comprises the combination of a thyristor 24 coupled in series opposition with a diode 26. Thyristor 24 is gated into conduction in response to a gate control signal from a gate control signal source 30. The frequency of gate control signals from gate control signal source 30 is determined by the duration of battery charge and discharge intervals and will be more fully explained by reference to the operation of battery charger circuit 10 as shown graphically in FIG. 3.

A commutating circuit 32 is coupled across thyristor 24 to commutate the same, that is to say, to extinguish current therethrough by reverse biasing the thyristor. Various commutating circuits exist for thyristor commutation and selection of an appropriate commutating circuit will will depend upon design parameters. Therefore, the details of commutating circuit 32 are not shown. For a further more detailed description of such commutating circuits, reference should be had to the paper "Thyristor Commutation Circuits in DC Choppers, a Comparative Study", by William McMurray, published in the Conference Record of the 1977 Annual Meeting of IEEE Industry Application Society.

The positive terminal of a battery 34 under charge is coupled through an inductor 36 to the common junction of thyristor 24 and diode 26 and thyristor 24' and diode 26' of chopper circuits 20 and 20', respectively. The negative battery terminal is connected to the negative terminal of current source 11.

It should be understood at this juncture, that although chopper circuits 20 and 20', respectively, have been described as including a thyristor such as 24 and 24', respectively, together with a commutating circuit 32 and 32', respectively, for thyristor commutation, a high current transistor can easily be substituted in place of each of thyristors 24 and 24' without adversely affecting the operation of battery charger circuit 10.

Operation of battery charger circuit 10 will now be explained with reference to FIGS. 1 through 3. To initially commence the interval during which battery 34 is to receive charge current, that is, that battery 34 current has a positive polarity, a gate control signal from gate control signal source 30 is impressed at gate terminal 28 of thyristor 24 rendering it conductive. Current from current source 11 as filtered by inductor 16 and capacitor 18 is supplied through thyristor 24, inductor 36, and battery 34, corresponding to positive battery charge current conduction as represented by interval A in FIG. 3. Battery charge current increases during this interval until thyristor 24 is commutated. With thyristor 24 substantially conconductive, the induced voltage developed across inductor 36 forward biases diode 26, permitting a decreasing current of unchanged direction through the battery to circulate within the loop of inductor 36, battery 34 and diode 26. The interval during which battery charge current circulates within the above-described loop is represented by interval B in FIG. 3. By providing a pulse to gate terminal 28 of thyristor 24 from gate control signal source 30 at appropriate intervals, and by commutating the thyristor at an appropriate interval following each pulse, the sawtooth waveform having the positively and negatively sloped portions A and B, resepctively, as shown in FIG. 3 will be produced.

The ratio of the time interval $T_{ON}$ during which thyristor 24 is conductive to the total time interval during which polarity of battery charge current is positive, may be calculated in the following manner. The average voltage at node X, corresponding to the time interval during which thyristor 24 is gated on, must be equal to the battery voltage $E_b$ because inductor 36, (assumed ideal for simplicity of description) cannot support a steady DC voltage. The total time interval during which battery charge current is positive ($T_{ON}+T_{OFF}$) will correspond to the voltage $E_s$ across capacitor 18, thus yielding the ratio $$[T_{ON}/(T_{ON}+T_{OFF})]=E_b/E_s \tag{1}$$

The battery charge current amplitude can be adjusted by appropriately varying the maximum and minimum charging current referencelevels denoted by $I_1$ and $I_2$ in FIG. 3.

The frequency at which thyristor 24 is gated "on" by gate control source 30 is dependent on the DC voltage $E_s$ across capacitor 18 and the battery 34 voltage $E_b$ as well as the size of inductor 36. As may be observed by examination of FIG. 3, the rate of change of current during thyristor conduction intervals can be given by the expression $$di/dt=(E_s-E_b/L_{36}) \tag{2}$$

where $L_{36}$ represents the inductance of inductor 36 while the rate of change of current during intervals when current conduction through thyristor 24 is extinguished can be given by the expression $$di/dt=-E_b/L_{36} \tag{3}$$

Relatively high switching frequencies are possible by the use of high frequency thyristors (e.g. up to 5 kHz) in this type of circuit and thus inductor 36 may have a relatively small magnitude. If still higher frequency is desired (although at lower power), high current, high frequency switching transistors may be employed, allowing a switching frequency of up to 50 kHz.

Battery discharge can be achieved during intervals when thyristor 24 is commutated by appropriately gating thyristor 24' into conduction. When thyristor 24 is commutated, the induced voltage across inductor 36 forward biases diode 26 resulting in an interval of decreasing current conduction in an unchanged direction through the battery within the loop of inductor 36, battery 34 and diode 26, as represented by interval C in FIG. 3.

Battery current decreases to zero and then reverses polarity as battery 34 begins to discharge through the current loop defined by inductor 36 and thyristor 24', during interval D as shown in FIG. 3. Battery discharge current continues to increase until thyristor 24' is commutated, and diode 26' is forward biased, permitting decreasing battery discharge current conduction through capacitor 18 for energy storage therein during interval E in FIG. 3. Battery discharge current continues to decrease in this manner, until thyristor 24' is again gated into conduction, at which time battery discharge current increases in a manner as described earlier. This interval during which battery discharge current increases is represented by interval F in FIG. 3. Thus, by alternately impressing a time variant signal from gate control signal source 30 on gate 28' of thyristor 24' and by commutating thyristor 24', the sawtooth waveform during each pair of intervals E and F, as shown in FIG. 3 will be produced.

To resume conduction of positive battery charge current, thyristor 24' is extinguished, permitting decreasing battery discharge current through diode 26' and capacitor 18 as represented by interval G in FIG. 3. When battery discharge current has decreased to zero, thyristor 24 is again gated into conduction, causing increasing positive battery charge current to be supplied from capacitor 18 for as long as the potential across capacitor 18, resulting from stored discharge energy, is greater than the potential across source 11 and inductor 16, and then from current source 11. Thyristor 24 continues to conduct battery charge current until such time as it is commutated, causing battery charge current to recirculate within the loop including forward biased diode 26 and inductor 36, as represented by interval B. Battery charge current is now conducted alternately through thyristor 24 and diode 26 as previously described during intervals A and B, respectively, until such time as discharge is again to be accomplished. From the above discussion, it may be seen that during intervals E and G when the battery is discharged, the discharge energy is not dissipated, but rather is returned to capacitor 18 to be stored for later reutrn to the battery during charging intervals. The magnitude and duration of battery discharge pulses as well as the frequency of gate control signal source 30 may be varied in response to a sensed battery parameter, such as gassing rate, by appropriate conventional control apparatus.

In practice, a typical range of discharge/charge intervals as given by Mas in his paper entitled "The Charging Process" published in the Proceedings of the 2nd Electric Vehicle Symposium at Atlantic City, New Jersey in November of 1971 and published by The Electric Vehicle Council, New York, New York, 1972 at page 228 for battery with 10-amp hours removed may be seen in the following table:

| % Charge Acceptance | Charge Interval | Discharge Interval |
|---|---|---|
| 0 | 3.6 sec. | 3.87 msec. |
| 50 | 1.8 sec. | 3.87 msec. |
| 90 | .36 sec. | 3.87 msec |

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. An improved battery charger circuit for rapidly and efficiently charging a battery by providing periodic, substantially lossless battery discharge at a high rate for short intervals during the charging process, comprising:
   (a) a DC current source;
   (b) energy storage means coupled to said DC current source for alternately storing battery discharge energy during battery discharge intervals and for supplying battery charging current from stored battery discharge energy during selected charging time intervals;
   (c) inductive means adapted for coupling to a battery to be charged for maintaining decreasing current conduction therethrough when connection to said DC source and energy storage means is interrupted;
   (d) a first chopper circuit coupling said inductive means to said current DC source and said energy storage means, said first chopper circuit responsive to external gate signals for conducting battery charge current therethrough from said DC current source and said energy storage means when said first chopper circuit is gated by an external gate signal for circulating said battery charge current during intervals other than when said first chopper circuit is gated by an external gate signal; and
   (e) a second chopper circuit coupling said DC current source and said energy storage means to said inductive means, said second chopper circuit responsive to external gate signals for alternately providing a low loss battery discharge path for high current battery discharge pulses when said second chopper circuit is gated by an external gate signal and for diverting current from said battery discharge path to said energy storage means during intervals other than when said second chopper circuit is gated.

2. The invention according to claim 1 wherein said energy storage means comprises a capacitor.

3. The invention according to claim 1 wherein each of said first and second chopper circuits comprises:
   (a) controlled unidirectional conduction means for permitting current conduction therethrough responsive to an external gate signal impressed thereon; and
   (b) unidirectional conduction means coupled in series opposition with said controlled unidirectional conduction means.

4. The invention according to claim 3 wherein said energy storage means comprises a capacitor.

5. The invention according to claim 3 wherein said controlled unidirectional conduction means comprises:
   (a) a thyristor having a gate control terminal coupled to receive external gate control signals and permitting current conduction therethrough in response to said external gate controlled signals; and
   (b) commutating circuit means coupled to said thyristor for extinguishing current conduction therethrough at predetermined intervals.

6. The invention according to claim 5 wherein said energy storage means comprises a capacitor.

7. The invention according to claim 3 wherein said unidirectional conduction means comprises a diode.

8. Apparatus for rapidly and efficiently charging a battery by providing periodic substantially lossless battery discharge at a high rate for short intervals during the charging process, comprising:
   (a) a DC current source;
   (b) a battery to be charged;
   (c) energy storage means coupled to said DC current source for storing battery discharge energy during battery discharge intervals and for supplying battery charge current from stored battery discharge energy during selected charging time intervals;
   (d) inductive means coupled to said battery for maintaining decreasing current conduction therethrough when connection to said DC current source and said energy storage means is interrupted;

(e) a first chopper circuit coupling said inductive means to said DC current source and said energy storage means, said first chopper circuit responsive to external gate control signals for conducting battery charge current therethrough from said DC current source and said energy storage means when said first chopper circuit is gated by an external gate signal and for circulating battery charge current during intervals other than when said first chopper circuit is gated; and (f) a second chopper circuit coupling said inductive means to said DC current source and said energy storage means, said second chopper circuit responsive to external gate control signals for providing a low loss battery discharge path for high current battery discharge pulses when said second chopper circuit is gated by an external gate signal and for diverting battery discharge current into said energy storage means during intervals other than when said second chopper circuit is gated.

* * * * *